United States Patent [19]

Saito

[11] Patent Number: 5,107,338
[45] Date of Patent: Apr. 21, 1992

[54] PRINTER DEVICE WITH PAGE SEQUENCE CONTROL USING BUFFER MEMORY AND BLANK PAGE DATA HOLDING SECTION

[75] Inventor: Yoshiaki Saito, Kanagawa, Japan

[73] Assignee: Fuji Xerox Co., Ltd., Tokyo, Japan

[21] Appl. No.: 626,531

[22] Filed: Dec. 12, 1990

[51] Int. Cl.5 .......................... H04N 1/21; H04N 1/23
[52] U.S. Cl. ...................................... 358/296; 358/444; 355/325
[58] Field of Search ............... 358/296, 300, 302, 401, 358/444, 464, 467; 355/325

[56] References Cited

U.S. PATENT DOCUMENTS

| | | |
|---|---|---|
| 4,640,607 | 2/1987 | Bray . |
| 4,681,428 | 7/1987 | Devoy . |
| 4,708,469 | 11/1987 | Bober et al. . |
| 4,763,161 | 8/1988 | Forest et al. . |
| 4,893,153 | 1/1990 | Sales ...................... 355/325 |
| 4,925,176 | 5/1990 | Acquaviva . |

Primary Examiner—Benjamin R. Fuller
Assistant Examiner—Scott A. Rogers
Attorney, Agent, or Firm—Finnegan, Henderson, Farabow, Garrett, and Dunner

[57] ABSTRACT

In a printer control device, original data is read from a buffer memory one plate by one plate and transmitted to the printer, and when the plate number of a blank page is reached, the blank page data is read from a page data holding section and transmitted to the printer, whereby the blank page can be printed without reading it with the image scanner, or when the plate number coincides with the number of a particular original plate, a special printing sheet such as a colored printing sheet or formatted printing sheet is supplied therefor.

7 Claims, 3 Drawing Sheets

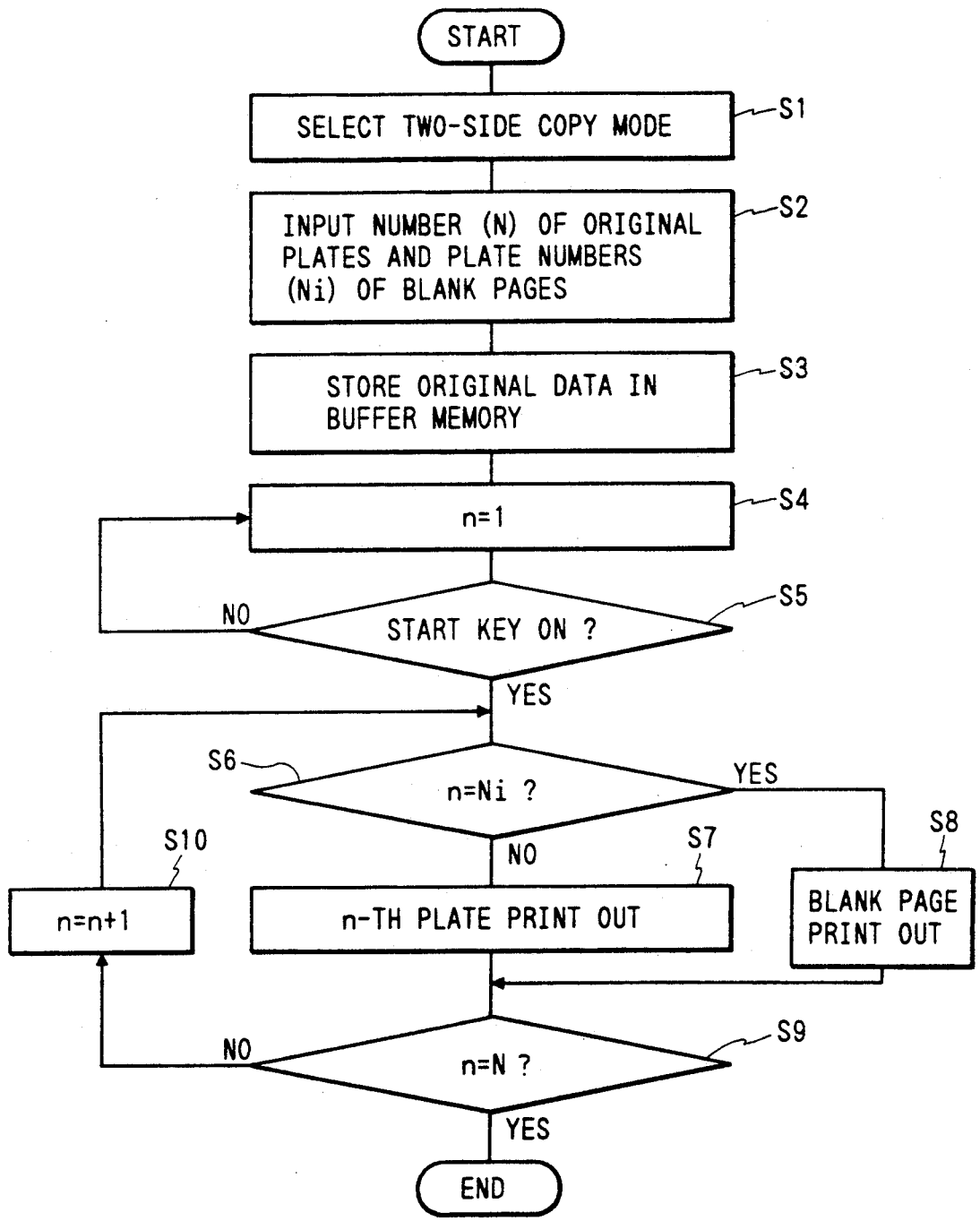

PRINTER DEVICE WITH PAGE SEQUENCE CONTROL USING BUFFER MEMORY AND BLANK PAGE DATA HOLDING SECTION

BACKGROUND OF THE INVENTION

1. Field of the Invention

This invention relates to printer control devices, and more particularly to a control device for a printer which can print out inputted data on an original (hereinafter referred to as "original data", when applicable) as hard copy.

2. Discussion of the Related Art

A conventional printer control device and a conventional printer will be described with reference to FIG. 4.

A printer control device 10 comprises a panel 11 with a ten key keyboard and other switches, an image scanner 12 for reading an original through photo-electric conversion, a sequence control section 13, and a buffer memory 14 for storing an image signal read by the image scanner 12 or an image signal of print data supplied through a network, for instance, by a work station.

The sequence control section 13 controls the operation of a printer 20 according to control data set by the panel 11 or control data supplied through the network. In this connection, the status data of the printer 20 is supplied through a line 13b to the sequence control section 13, and a variety of commands are supplied through a line 13b to the printer 20.

One or more pages of original data to be printed is stored in the buffer memory 14. When the printer 20 starts its printing operation, the sequence control section 13 provides an instruction signal, so that the original data is read out of the buffer memory 14 with predetermined timing, and applied to the printer 20.

The printer 20 comprises a laser oscillator 21, a photoreceptor 22, a developing unit 23, a transferring corotron 24, and a fixing unit 25. A printing sheet is supplied from a sheet supplying tray 26a or 26b. A toner image is transferred onto the printing sheet by the transferring corotron 24, and is then fixed by the fixing unit 25. Finally, the printing sheet is delivered into a sheet discharging tray 27.

In the printer 20 described above, the image is printed on only one side of the printing sheet. However, it should be noted that a duplex printer has been proposed in the art in which images are printed on both sides of a printing sheet. In the duplex printer, the one page of original data is printed on one side of a printing sheet in the above-described manner, and then the printing sheet is turned over and delivered to the transferring corotron 24 with predetermined timing. The toner image of the next page of original data is transferred onto the other side of the printing sheet and then fixed by the fixing unit 25. Thereafter, the printing sheet is delivered into a sheet discharging tray 27.

With the above-described printer, a variety of print data can be printed out. For instance, print data on both sides of a leaf (page) of paper in a book or the like are read with the image scanner 12, so as to be stored in the buffer memory 14 temporarily. Under this condition, the printer 20 is placed in a duplex copy mode, so that the stored print data is printed on both sides of a printing sheet. The resultant printing sheets are bound into a book similar to the original one.

Alternatively, print data of a number of pages are read through the image scanner 12 or through the network, so as to be stored in the buffer memory 14 temporarily, and are then printed out on one or both sides of a printing sheet.

The conventional printer suffers from several problems. In the case of an original like a book which has pages printed on both sides it is common for the back side of the page to be blank. In the case where such an original is copied in the duplex copy mode, it is necessary to read the blank page with the image scanner 12 similarly as in the case of ordinary pages with print. This is a wasteful operation.

On the other hand, in a printing operation, sometimes it is required to use a colored printing sheet or a formatted printing sheet for the cover or for specified pages of an original to be copied so that they be impressive. However, it is impossible for the conventional printer to meet this requirement, because in the conventional printer one sheet supplying tray is used to supply the same printing sheets for all operations.

SUMMARY OF THE INVENTION

Accordingly, an object of the present invention is to eliminate the above-described difficulties accompanying a conventional printing technique.

More specifically, an object of the present invention is to provide a printer control device with which a blank page can be printed although the blank page is not read with the image scanner.

Another object of the present invention is to provide a printer control device with which print data of a page specified by the panel can be printed on a printing sheet supplied from a special sheet supplying tray provided in addition to an ordinary sheet supplying tray.

Additional objects and advantages of the present invention will be set forth in part in the description which follows and in part will be obvious from the description, or may be learned by practice of the invention. The objects and advantages of the invention may be realized and attained by means of the instrumentalities and combinations particularly pointed out in the appended claims.

The foregoing objects and other objects of the invention have been achieved by the provision of the following printer control devices:

One of the printer control devices, according to a first aspect of the invention, comprises a buffer memory for storing inputted original data as image data, a blank page data holding section for holding blank page data, means for inputting the number of original plates and the plate number of a blank page; and control means for reading the original data from the buffer memory one plate by one plate and transmitting the original data thus read to a printer, and for reading, when the plate number coincides to the plate number of the blank page, the blank page data from the blank page data holding section and transmitting the blank page data thus read to the printer. When the plate number, of the blank page is reached, the blank page data is read out of the blank page data holding section and transmitted to the printer. Hence, it is unnecessary for the operator to read the blank page with the image scanner. This will reduce the amount of work of the operator, thus decreasing the time required for printing.

Another of the printer control devices, according to another aspect of the invention, comprises a buffer memory for storing inputted original data as image data, means for inputting the number of a particular original plate and the identification number of a sheet supplying tray for the particular original plate, and control means for reading the original data from the buffer memory one plate by one plate and transmitting the original data thus read to a printer, and providing an instruction signal to supply a printing sheet from the sheet supplying tray when the plate number coincides with the number of the particular original plate. With the printer control device, when the particular plate number is reached, the sheet supply tray provided therefor is activated to supply the special printing sheet. Hence, the original data of the plate number is printed on the special printing sheet, so that the selected one of the pages can be emphasized in impression.

BRIEF DESCRIPTION OF THE DRAWINGS

The nature, principle and utility of the invention will become more apparent from the following detailed description when read in conjunction with the accompanying drawings.

In the accompanying drawings:

FIG. 2 is a flow chart for a description of the operation of the printer control device shown in FIG. 1;

DESCRIPTION OF THE PREFERRED EMBODIMENTS

Preferred embodiments of this invention will be described with reference to the accompanying drawings.

Figure 1:
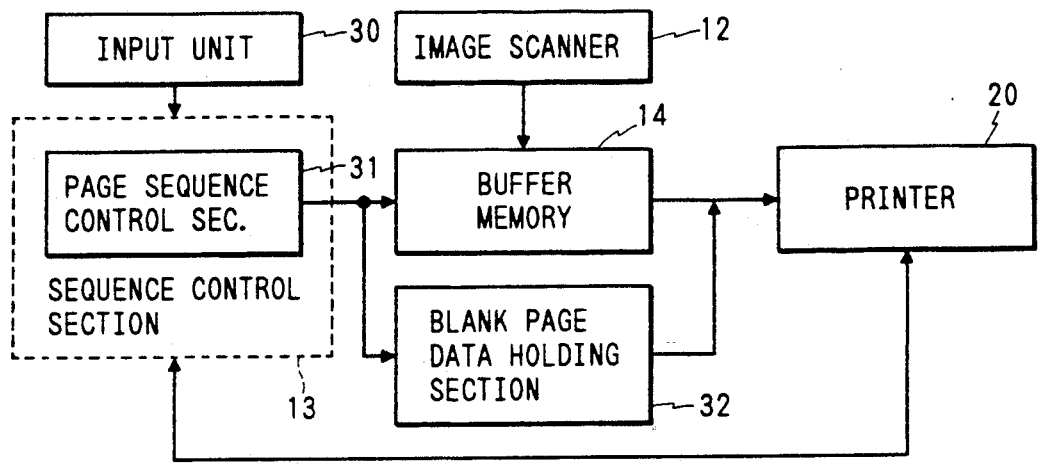
FIG. 1 is a block diagram showing the arrangement of a printer control device according to a first embodiment of this invention.
Figure 4:
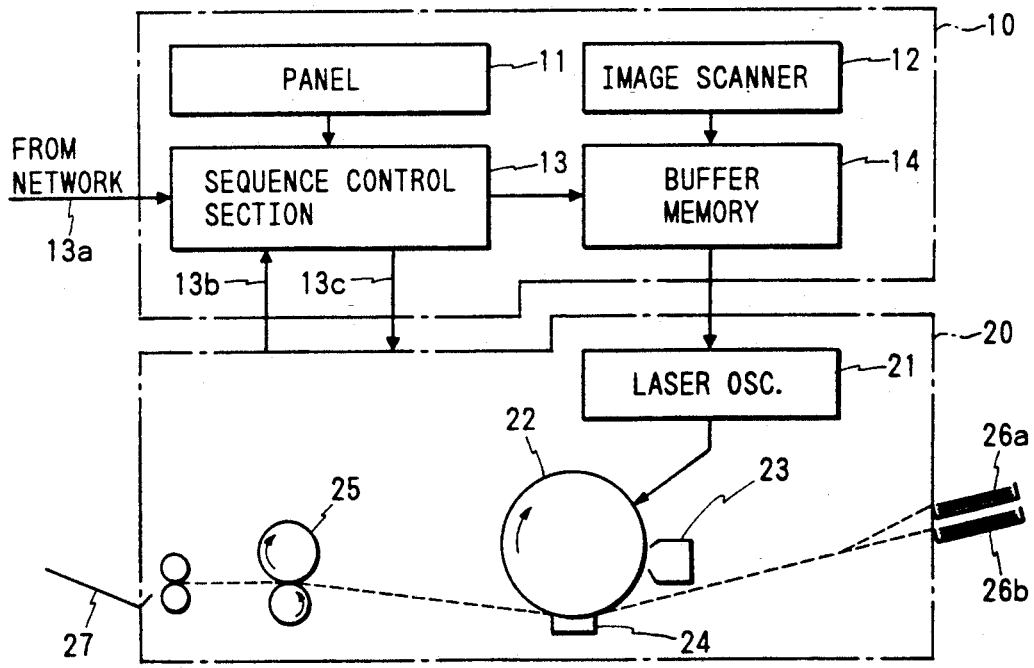
FIG. 4 is a block diagram outlining the arrangement of a printer.

FIG. 1 is a block diagram showing essential components of a printer control device according to a first embodiment of the invention. In FIG. 1, those components which have been previously described with reference to FIG. 4 are designated by the same reference numerals. Further in FIG. 1, an input unit 30 comprises the above-described panel 11 etc., a page sequence control section 31 and a blank page data holding section 32.

The page sequence control section 31 is a part of the sequence control section 13 (FIG. 4) described before, having functions described later. The blank page data holding section 32 holds blank data for one page, "0" data for instance.

The operation of the embodiment thus organized will be described with reference to FIG. 2.

When a duplex (two-side) copy mode is selected with the input unit (Step S1), the sequence control section 13 sets the duplex copy mode for the printer 20. Thereafter, the number of original plates (N) and the plate numbers (=$N_i$, where i is an integer) of the blank pages are inputted through the input unit 30, and are held by the page control section 31 (Step S2). Under this condition, original data is read with the image scanner 12 and stored in the buffer memory 14 (Step S3). Then, with n=1 (Step S4), it is determined whether or not a print start key is turned on in the input device 30 (Step S5).

When it is determined that the print start key has been turned on, it is determined whether or not n=$N_i$ is established (Step S6); that is, it is determined whether or not the plate number of a blank page is reached. When the determination results in "No," the flow shifts to S7.

In Step 7, the page sequence control section 31 reads the original data of the n-th plate and sends it to the printer 20 (Step S7). As a result, the original data of the n-th plate is printed on one side of the printing sheet.

When, on the other hand, "Yes" results from the determination of Step S6, the blank page data is read from the blank page data holding section 32 and is transmitted to the printer 20 (Step 8). As a result, the next printing sheet is left blank.

Next, in Step S9, it is determined whether or not n=N is established. When it is determined that n=N is not established, the flow shifts to Step 10. In Step S10, 1 is added to n (n=n+1), and flow returns to Step S6, and the above-described operation is carried out again.

The printer operates in the duplex copy mode as usual. Therefore, the data supplied from the buffer memory 14 and the blank page data holding section 32 are successively printed on both sides of printing sheets.

As is apparent from the above description, in the case where the printed pages outputted by the printer are bound into a book, according to the invention, all blank pages correspond to the same position as in the original so that a copy of the duplex original can be readily formed.

Now, a second embodiment of the invention will be described with reference to FIG. 3. The second embodiment is intended to meet the requirement that the cover or particular pages of print data should be printed on colored printing sheets or formatted printing sheets.

The printer, as shown in FIG. 4, has at least two sheet supplying trays 26a and 26b. The operator can select one of the sheet supply trays by operating the panel 11.

For convenience in description, it is assumed that the sheet supplying trays 26a and 26b are numbered n0 and n1, respectively, and ordinary white printing sheets are stacked in tray 26a, and special printing sheets, such as colored printing sheets or formated printing sheets, are stacked in the latter tray 26b.

Figure 3:
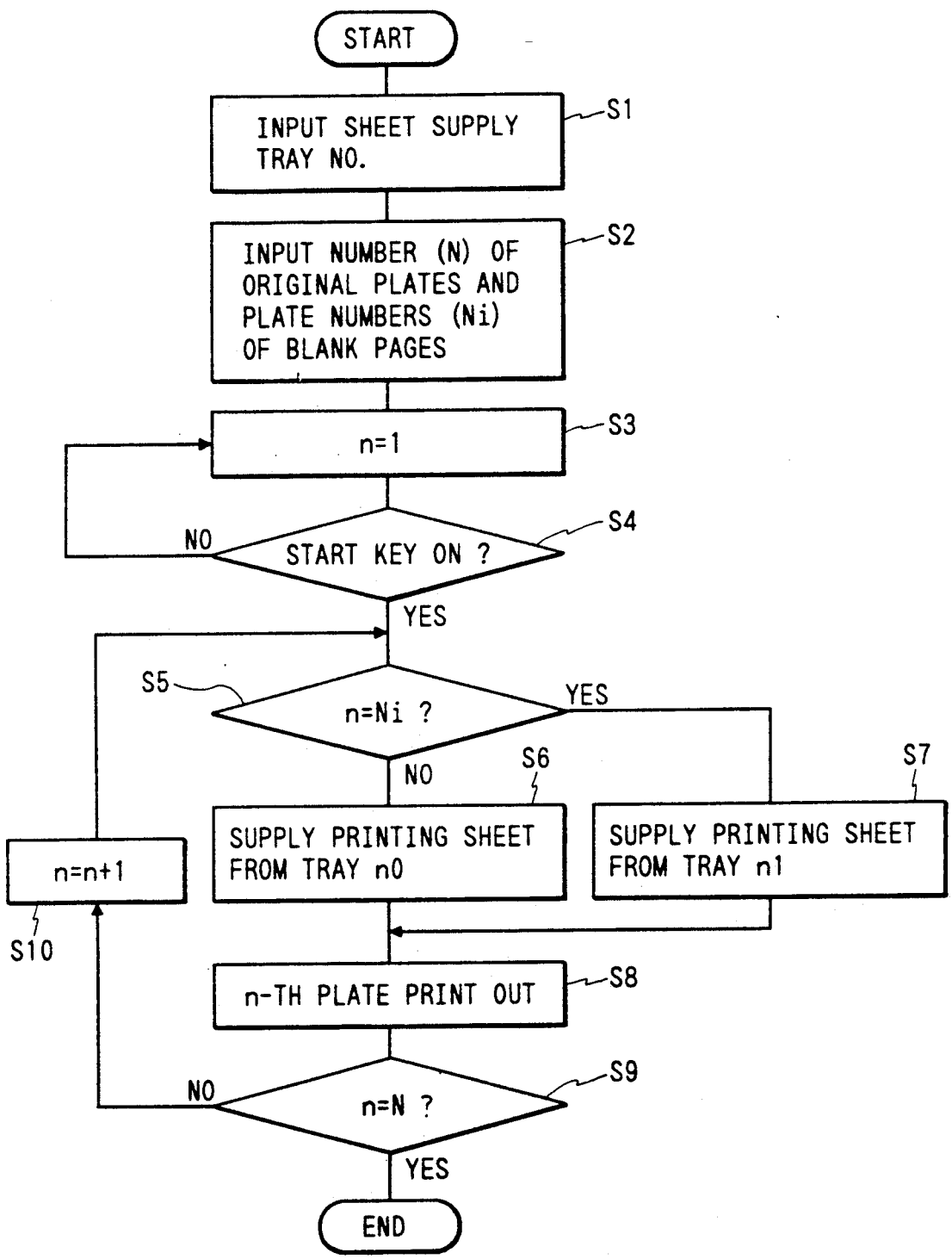
FIG. 3 is a flow chart for a description of the operation of another printer control device according to a second embodiment of the invention.

The sequence control section 13 (FIG. 1) operates as shown in FIG. 3. First, the sheet supplying tray number, i.e., n0 or n1, inputted with the input unit 30 (Step S1), and then the number of original plates (N) and the plate numbers ($N_i$, where i is an integer) of the original pages to be printed with special sheets from tray number n1, are inputted (Step S2). Thereafter, with n=1 set (Step S3), it is detected whether or not the print start key has been turned on in the input unit 30 (Step S4).

Next, it is determined whether or not n=$N_i$ is established (Step S5). When it is determined that n=$N_i$ is not established; that is, the determination results in "No," Step S6 is performed. In Step S6, printing sheet in the sheet supplying tray number n0 are supplied. When, on the other hand, the determination results in "Yes," printing sheets in the sheet supplying tray number n1 are supplied (Step S7). That is, when the plate number is other than $N_i$, ordinary white printing sheets are supplied; and when the plate number is $N_i$, special printing sheets are supplied from the sheet supplying tray numbered n1.

Under this condition, the original data of the n-th plate is read from the buffer memory 14 and supplied to the printer (Step S8). As a result, the original data of the n-th plate is printed on the printing sheet supplied from the sheet supplying tray which has been selected in Step S6 or S7.

In Step S9, it is determined whether or not n=N is established in order to determine whether any plate remains to be printed. When it is determined that n=N is not established, Step 10 is performed. In Step S10, 1 is added to n (n=n+1), Step S5 is performed, and the above-described operation is carried out again. When it is determined that n=N, the above-described series of operations is ended.

Thus, when required special printing sheets supplied from sheet supplying tray number n1 can be used for selected pages. This will provide custom printing ability to comply with the operator's request.

As is apparent from the above description, the invention has the following effects or merits:

(1) It is unnecessary to input blank pages through the image scanner. Hence, the amount of work of the operator is decreased as much, and accordingly the time required for obtaining the desired printing is reduced.

(2) Printing sheets different in color from printing sheets normally used, or formatted printing sheets can be used for the cover and other selected pages of the original document to allow the printed sheets to have a customized expression.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A printer control device, comprising:
    a buffer memory for storing original data as plates of image data;
    a blank page data holding section for holding blank page data;
    means for inputting the number of original plates of a document to be printed and for inputting the plate numbers of blank pages in the document; and
    control means for transferring said original data from said buffer memory one plate at a time for printing by a printer, for determining when said plate number to be printed corresponds to the plate number of said blank page, and for transferring blank page data from said blank page data holding section such than the document is printed with blank pages interspersed to said printer in proper sequence with pages printed with said original data.

2. The device of claim 1, wherein said original data is supplied to said buffer memory from a network.

3. The device of claim 1, wherein said original data is supplied to said buffer memory from a image scanner.

4. A printer control device, comprising:
    a buffer memory for storing original data as plates of image data;
    means for receiving the numbers of selected original plates to be printed on sheets supplied from a selected tray of printing sheets; and
    control means for transferring said original data from said buffer memory one plate at a time for sequential printing by a printer, for determining when a plate number to be printed corresponds to one of the selected plate numbers, and for causing a printing sheet to be supplied to said printer from said selected tray when said plate number coincides with the umber of one of the selected plate numbers.

5. The device of claim 4, wherein said original data is supplied to said buffer memory from a network.

6. The device of claim 4, wherein said original data is supplied to said buffer memory from a image scanner.

7. The device of claim 4, wherein said selected sheet supplying tray supplies colored paper to said printer.

* * * * *

UNITED STATES PATENT AND TRADEMARK OFFICE
CERTIFICATE OF CORRECTION

PATENT NO. : 5,107,338
DATED : April 21, 1992
INVENTOR(S) : Yoshiaki Saito

Page 1 of 3

It is certified that error appears in the above-indentified patent and that said Letters Patent is hereby corrected as shown below:

On the title page, Item [54] Title, delete "AND BLANK"

Abstract, line 4, after "from a" insert --blank--.
Claim 1, column 5, line 39, change "original data as" to --pages of an original documents as numbered--.
Claim 1, column 5, line 40, before "image" insert --original--.
Claim 1, column 6, line 3, change "the number of original plates of a" to --plate numbers corresponding to pages of said original--.
Claim 1, column 6, line 4, before "plate" delete "the".
Claim 1, column 6, line 6, after "original" insert --image--.
Claim 1, column 6, line 8, change "number" to --numbers--.
Claim 1, column 6, line 9, change "number" to --numbers--.

UNITED STATES PATENT AND TRADEMARK OFFICE
CERTIFICATE OF CORRECTION

PATENT NO. : 5,107,338
DATED : April 21, 1992
INVENTOR(S) : Yoshiaki Saito

It is certified that error appears in the above-indentified patent and that said Letters Patent is hereby corrected as shown below:

Claim 1, column 6, line 9, change "corresponds to the plate number" to --correspond to said plate numbers--.
Claim 1, column 6, line 14, after "original"
insert --image--.
Claim 3, column 6, line 17, after "original"
insert --image--.
Claim 3, column 6, line 18, before "image" change "a"
to --an--.
Claim 4, column 6, line 22, change "the numbers of selected original plates" to --selected plate numbers--.
Claim 4, column 6, line 22, change "the numbers of selected original plates" to --selected plate numbers--.
Claim 4, column 6, line 32, change "umber" to --number--.

UNITED STATES PATENT AND TRADEMARK OFFICE
CERTIFICATE OF CORRECTION

PATENT NO. : 5,107,338
DATED : April 21, 1992
INVENTOR(S) : Yoshiaki Saito

It is certified that error appears in the above-indentified patent and that said Letters Patent is hereby corrected as shown below:

Claim 6, column 6, line 37, before "image" change "a" to --an--.

Signed and Sealed this

Twelfth Day of October, 1993

*Attest:*

BRUCE LEHMAN

*Attesting Officer*   *Commissioner of Patents and Trademarks*